United States Patent [19]

Taylor

[11] Patent Number: 4,546,159

[45] Date of Patent: Oct. 8, 1985

[54] ELIMINATING POLYMERS USEFUL IN DIFFUSION CONTROL LAYERS

[75] Inventor: Lloyd D. Taylor, Lexington, Mass.

[73] Assignee: Polaroid Corporation, Cambridge, Mass.

[21] Appl. No.: 248,680

[22] Filed: Mar. 30, 1981

Related U.S. Application Data

[62] Division of Ser. No. 130,527, Mar. 14, 1980, Pat. No. 4,288,523.

[51] Int. Cl.[4] ........................ C08F 28/02; C08F 22/30

[52] U.S. Cl. .................................... 526/286; 430/215; 526/287; 526/288; 526/298; 526/303.1; 526/304; 526/306; 560/172

[58] Field of Search ............... 526/298, 263, 286, 287, 526/288, 304, 303.1, 306

[56] References Cited

U.S. PATENT DOCUMENTS

| | | | |
|---|---|---|---|
| 3,345,163 | 10/1967 | Land et al. | 96/3 |
| 3,362,819 | 1/1968 | Land | 96/3 |
| 3,384,483 | 5/1968 | Becker | 96/29 |
| 3,421,892 | 1/1969 | Taylor | 96/3 |
| 3,488,327 | 1/1970 | Kollinsky et al. | 260/78.3 |
| 3,615,422 | 10/1971 | Haberlin | 96/3 |
| 3,709,690 | 1/1973 | Cohen et al. | 96/67 |
| 3,713,834 | 1/1973 | Fitzgerald | 430/630 |
| 3,749,577 | 7/1973 | Hollister et al. | 96/114 |
| 3,772,025 | 11/1973 | Land | 96/76 R |
| 4,038,082 | 7/1977 | Yoshida et al. | 96/77 |
| 4,120,727 | 10/1978 | Fitzgerald | 96/114 |
| 4,172,934 | 10/1979 | Heilmann | 526/298 |
| 4,201,587 | 5/1980 | Bedell et al. | 430/224 |
| 4,297,431 | 10/1981 | Sullivan | 430/215 |

FOREIGN PATENT DOCUMENTS 1121418 7/1968 United Kingdom .

OTHER PUBLICATIONS

U.S. Publ. pat. appl. No. B320,452, published 1/28/75.

Iwakura et al., J. Polym. Sci., A-1, vol. 6,2681, (1968).

Crosby et al., J. Chem. Soc., B, 1970, p. 671.

*Primary Examiner*—Christopher A. Henderson

*Attorney, Agent, or Firm*—Louis G. Xiarhos

[57] ABSTRACT

Novel polymers comprising recurring units capable of undergoing β-elimination in an alkaline environment are disclosed for use in diffusion control layers in diffusion transfer film units.

8 Claims, 4 Drawing Figures

ELIMINATING POLYMERS USEFUL IN DIFFUSION CONTROL LAYERS

This application is a division of application Ser. No. 130,527, filed Mar. 14, 1980, and now U.S. Pat No. 4,288,523, issued Sept. 8, 1981.

The present invention relates to photography and particularly to products adapted for employment in forming photographic diffusion transfer images. In particular, the present invention is directed toward novel polymers and to the use of these polymers in diffusion control layers of diffusion transfer film units.

According to the present invention, novel polymers have been discovered which comprise recurring units capable of undergoing β-elimination in an alkaline environment to convert a layer comprising one or more of said polymers from a condition of impermeability to alkali or materials soluble in or solubilized by an aqueous alkaline processing composition to a condition of substantial permeability thereto. It has also been discovered that layers comprising these novel polymers may be used as diffusion control interlayers or overcoats in photosensitive elements and negative components of diffusion transfer film units and as timing layers or overcoats in image-receiving elements and positive components of diffusion transfer film units.

It is thus an object of the present invention to provide novel polymers comprising recurring units capable of undergoing β-elimination in the presence of alkali.

It is another object of the present invention to provide novel diffusion transfer photographic film units comprising at least one diffusion control layer comprising the novel polymers of the present invention.

It is another object of the present invention to provide novel diffusion control layers comprising the polymers of the present invention for use in diffusion transfer processes.

Another object of the present invention is to provide a novel image-receiving element adapted for use in diffusion transfer film units and comprising a diffusion control layer having predetermined permeability characteristics and comprising a novel polymer of the present invention.

Another object of the present invention is to provide novel integral negative-positive diffusion transfer film units comprising at least one diffusion control interlayer, timing layer, or overcoat layer comprising the novel polymers of the present invention.

Still another object of the present invention is to provide a novel photosensitive element for use in diffusion transfer processes which photosensitive element comprises a diffusion control interlayer or overcoat having predetermined permeability characteristics and comprising a novel polymer of the present invention.

Other objects of the present invention will become apparent from the description appearing hereinafter.

For a fuller understanding of the nature and objects of the invention, reference should be had to the following detailed description taken in connection with the accompanying drawings, wherein.

Figure 1:
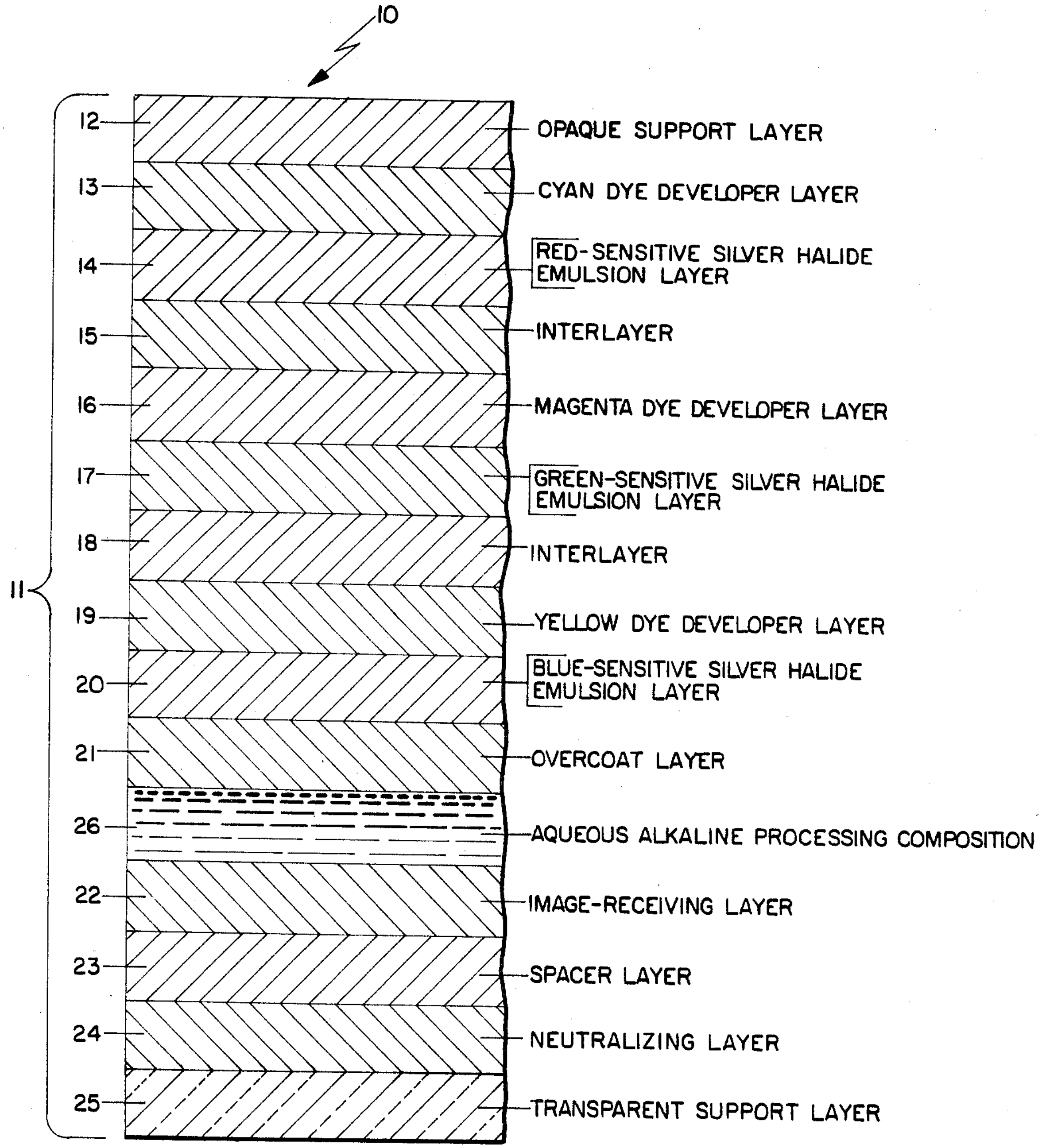
FIG. 1 is a cross-sectional view of a photographic film unit including diffusion control layers of this invention.

As mentioned hereinabove, novel polymers have been discovered which are capable of converting a layer comprising one or more of said polymers from a condition of impermeability to alkali or materials soluble in or solubilized by an aqueous alkaline processing composition to a condition of substantial permeability thereto by undergoing a β-elimination reaction in an alkaline environment. It has also been discovered that layers comprising these polymers can be used as diffusion control layers in diffusion transfer film units. These diffusion control layers have been found to be useful as overcoats or interlayers in photosensitive elements and negative components of diffusion transfer film units or as timing layers or overcoats in image-receiving elements and positive components of diffusion transfer film units. The diffusion control layers hereof function by forming an impermeable "barrier" layer which prevents passage or diffusion therethrough of either alkali or materials soluble in or solubilized by an aqueous alkaline processing composition for a predetermined length of time during processing of the film unit and then converting over a relatively short time period to a condition of substantial permeability to these materials as a result of the polymers hereof undergoing β-elimination. These diffusion control layers are thus "hold-release" layers in that materials intended to be subject to diffusion control by the layer are "held" in place for a predetermined period of time and then are "released" in substantial quantity over a relatively short time period, i.e., allowed to rapidly diffuse through the layer. This desirable "hold-release" behavior may be contrasted with the diffusion control properties of those diffusion control layers of the prior art which are not capable of undergoing a precipitous change in permeability but rather are initially permeable to some degree, and thus allow a slow leakage of material from the start of processing, and gradually become more permeable during the processing interval.

The novel polymers of the present invention comprise essential recurring units capable of undergoing β-elimination and having the formula (I)

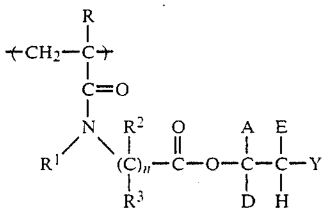

(I)

wherein R is hydrogen or lower alkyl; $R^1$ is hydrogen or lower alkyl; $R^2$ and $R^3$ can each independently be hydrogen; lower alkyl, e.g., methyl, ethyl, propyl, isopropyl; substituted lower alkyl, e.g., hydroxymethyl, hydroxyethyl, methylthioethyl; aryl, e.g., phenyl, naphthyl; alkaryl, e.g., tolyl; aralkyl, e.g., benzyl; cycloalkyl, e.g., cyclohexyl; or $R^2$ and $R^3$ together with the carbon atom to which they are bonded can constitute a carbocyclic or heterocyclic ring, e.g.

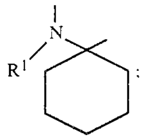

or $R^3$, when substituted on the methylene carbon atom next adjacent the nitrogen atom shown in formula (I) can be taken together with $R^1$ to form part of a substituted or unsubstituted N-containing ring, e.g.,

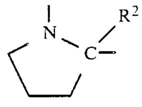

or

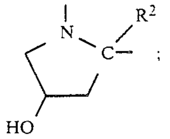

A, D, and E are selected from the group consisting of hydrogen, methyl, and phenyl, provided that no more than one of A, E, or D may be methyl or phenyl; Y is a $\beta$-elimination activating group; and n is a positive integer one to six. It will be appreciated that each of the n number of

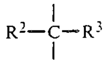

groups can be substituted the same or differently. For purposes of brevity and convenience the recurring units of formula (I) are hereinafter referred to simply as "$\beta$-elimination units".

The novel polymers of this invention can be homopolymers or copolymers, including graft or block copolymers. The copolymers of this invention can contain units provided by copolymerization with various ethylenically unsaturated monomers such as alkyl acrylates, alkyl methacrylates, acrylamides, and methacrylamides. In general these comonomeric units are utilized to provide particular predetermined properties to the polymer such as coatability and viscosity and, in particular, predetermined permeability characteristics.

In general, the polymers of the instant invention will contain the recurring $\beta$-elimination units in an amount sufficient to provide to a diffusion control layer the capacity for appreciable conversion from a relatively impermeable condition to a condition of relative permeability upon $\beta$-elimination and, thus, to provide functionality to the diffusion control layer as set forth herein. In the copolymers of this invention the proportion of the $\beta$-elimination units to the total units of the polymer will vary depending on the nature of the particular $\beta$-elimination units employed, the nature of comonomeric and polymeric materials utilized therewith, and upon the particular and predetermined permeability characteristics desired.

In a preferred embodiment of the present invention, the polymers comprise $\beta$-elimination units of formula (I) wherein $R^1$ is hydrogen and n is one. These preferred $\beta$-elimination units may thus be more specifically represented by the following formula (II):

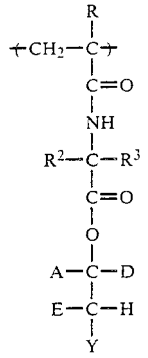

(II)

wherein R, $R^2$, $R^3$, A, D, E, and Y are as previously defined. Polymers comprising these preferred $\beta$-elimination units may be prepared with facility and have been found to be capable of rapidly converting a layer from a condition of impermeability to a condition of permeability in an alkaline environment, such as that provided by a diffusion transfer processing composition, at a rate consistent with efficient utilization in diffusion transfer processes.

In general, a $\beta$-elimination reaction involves the elimination or removal of two groups from a parent molecule, said groups being substituted on adjacent atoms, i.e., $\beta$ to each other, with the elimination or removal resulting in the formation of a more unsaturated bond, usually a double bond, between the adjacent atoms. With reference to polymers comprising units of formula (II), the $\beta$-elimination reaction undergone by the polymers of this invention may be represented as follows:

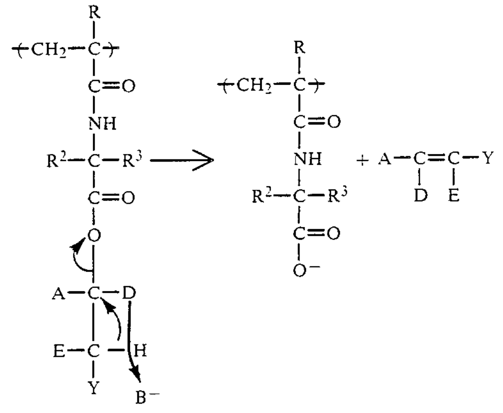

wherein $B^-$ is an anionic base. The above reaction scheme indicates that the anionic polymer unit formed by the $\beta$-elimination is effectively a leaving group removed from the parent molecule (starting polymer) in order to effect formation of the double bond of the ethylene compound

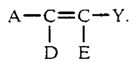

The activating group Y can be any group which is photographically innocuous and capable of stabilizing the carbanionic species formed by abstraction of the acid-labile proton by the anionic base. A study of such activating groups has been provided by J. Crosby and C. J. M. Stirling in J. Chem. Soc., B, 1970, p. 671. Activating groups which may be used in the present invention include sulfones of the formula $-SO_2W$ wherein W is aryl, aralkyl, alkaryl, alkyl, alkoxy, amino, or substituted amino; carbonyl groups of the formula

wherein T is hydrogen alkyl, alkoxy, amino, or substituted amino; sulfoxide groups of the formula

wherein G is aryl, alkyl, alkaryl or aralkyl; and cyano.

Preferred polymers of this invention include those comprising recurring units of the following formulae:

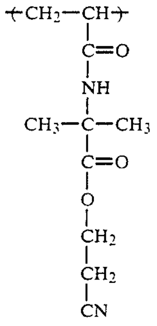

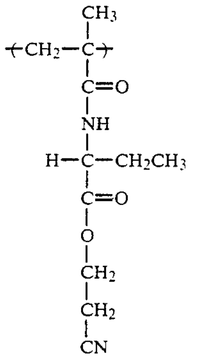

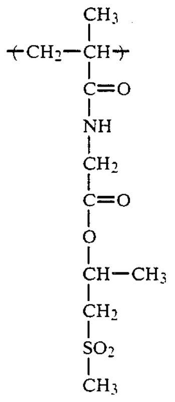

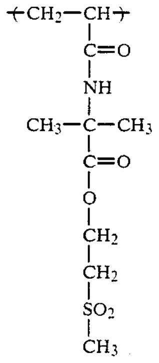

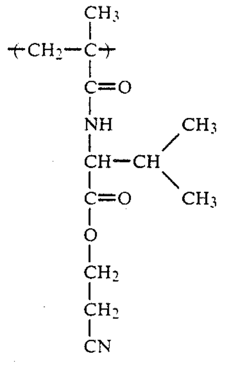

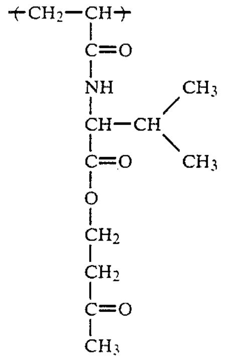

-continued

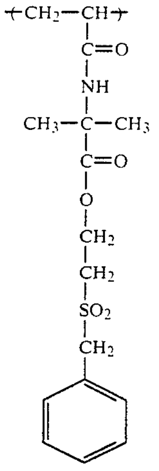

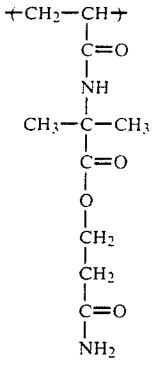

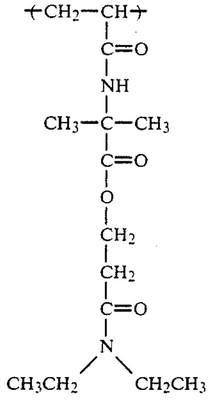

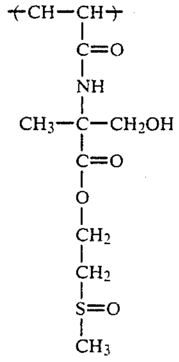

As mentioned previously, the polymers of this invention can be copolymers comprising the $\beta$-elimination monomeric units and a variety of comonomeric units incorporated into the polymer to impart thereto predetermined properties. For example, the "hold time", i.e., the time interval during which a diffusion control layer remains impermeable during processing, can be affected by the relative hydrophilicity of the layer resulting from incorporation of a given comonomer or mixture of comonomers into the $\beta$-elimination polymer. In general, the more hydrophobic the polymer, the slower will be the rate of permeation of alkali into a diffusion control layer to initiate the $\beta$-elimination reaction, i.e., the longer the hold time. Alternatively, adjustment of the hydrophobic/hydrophilic balance of the polymer by inclusion of appropriate comonomeric units may be used to impart selective permeability characteristics to a diffusion control layer as appropriate for a given usage within a film unit. For example, as detailed hereinbelow, it is highly preferred that diffusion control interlayers in the negative component of the film unit be initially substantially permeable to alkali, water, and various other components of the processing composition while substantially impermeable to the image-providing materials of the film unit up to a predetermined point in the development process. Such selective permeability may be achieved in the present invention by inclusion of appropriate comonomeric units, generally of a relatively hydrophilic nature, into the $\beta$-elimination polymers hereof or, more particularly, by "balancing"

the hydrophobic and hydrophilic moieties to achieve the desired permeability.

Examples of suitable comonomers for use in the present invention include acrylic acid; methacrylic acid; 2-arylamido-2-methylpropane sulfonic acid; N-methyl acrylamide; methacrylamide; ethyl acrylate; butyl acrylate; methyl methacrylate; N-methyl methacrylamide; N-ethyl acrylamide; N-methylolacrylamide; N,N-dimethyl acrylamide; N,N-dimethyl methacrylamide; N-(n-propyl)acrylamide; N-isopropyl acrylamide; N-(β-hydroxy ethyl) acrylamide, N-(β-dimethylamino)acrylamide; N-(t-butyl)acrylamide; N-[β-(dimethylamino)ethyl]methacrylamide; 2-[2'-(acrylamido)ethoxy]ethanol; N-(3'-methoxy propyl)acrylamide; 2-acrylamido-3-methyl butyramide; acrylamido acetamide; methacrylamido acetamide; 2-[2'-methacrylamido-3'-methyl butyramido]acetamide; and diacetone acrylamide.

As examples of useful copolymers of this invention mention may be made of:

(1) β-cyanoethyl-N-acrylyl-2-methylalanine/acrylic acid:
CEAMA/AA=97/3 (parts by weight)

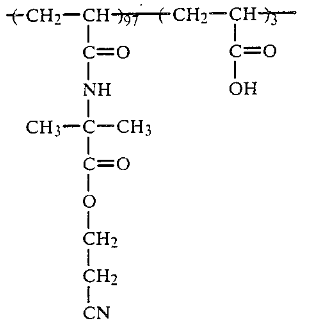

(2) β-cyanoethyl-N-acrylyl-2-methylalanine/acrylic acid/2-acrylamido-2-methylpropane sulfonic acid:
CEAMA/AA/AMPS=96/3/1 (parts by weight)

(3) β-cyanoethyl-N-acrylyl-2-methylalanine/diacetone acrylamide/2-acrylamido-2-methylpropane sulfonic acid:
CEAMA/DAA/AMPS=65/34/1 (parts by weight)

(4) β-cyanoethyl-N-acrylyl-2-methylalanine/butyl acrylate:
CEAMA/BA=90/10 parts by weight (5) β-cyanoethyl-N-acrylyl-2-methylalanine/2-acrylamido-2-methylpropane sulfonic acid:
CEAMA/AMPS=99/1 (parts by weight)

(6) β-cyanoethyl-N-acrylyl-2-methylalanine/diacetone acrylamide/methacrylic acid:
CEAMA/DAA/MAA=50/48/2 (parts by weight)

(7) β-cyanoethyl-N-acrylyl-2-methylalanine/butyl acrylate/methacrylic acid/2-sulfoethyl methacrylate:
CEAMA/BA/MAA/SEMA=10/85/2/3

The β-elimination reaction which the β-elimination polymers of the diffusion control layers of this invention undergo ensures that those materials intended to be subject to diffusion control by the diffusion control layer are "held" in place for a predetermined period of time and then "released" over a relatively short time period, the polymer layer undergoing a relatively rapid increase in hydrophilicity and water swellability and thus, permeability as a result of the β-elimination reaction. The predetermined hold time may be adjusted as appropriate for a given photographic process by means such as controlling the mole ratio or proportion of β-elimination units in the polymer; altering the thickness of the diffusion control layer; incorporating appropriate comonomeric units into the β-elimination to impart thereto a desired hydrophobic/hydrophilic balance or degree of coalescence; utilizing different activating groups Y to affect the rate of β-elimination; or utilizing other materials, particularly polymeric materials, in the diffusion control layer to modulate the permeation therethrough of alkali or aqueous alkaline processing composition, thereby altering the time necessary for substantial β-elimination to occur. This latter means of adjusting the hold time of the layer may include, for example, utilization of a matrix polymer material having a predetermined permeability to alkali or aqueous alkaline processing composition as determined, for example, by the hydrophobic/hydrophilic balance or degree of coalescence thereof. In general, increased permeability to alkali or aqueous alkaline processing composition and, thus, a shorter hold time, may be obtained by increasing the hydrophilicity of the matrix polymer or decreasing the degree of coalescence.

In addition to affecting the hold time of the diffusion control layers of this invention, matrix polymers may also be used to modulate the permeability of the layers to alkali or materials soluble in or solubilized by an aqueous alkaline processing composition and thus affect the functionality of the layers within a film unit. For example, relatively hydrophobic matrix polymers or matrix polymers having a relatively high degree of coalescence may help to render diffusion control layers hereof substantially impermeable to alkali until β-elimination occurs, thus providing functionality to such layers as alkali neutralization timing layers or overcoat layers in image-receiving elements and positive components of diffusion transfer film units. Alternatively, relatively hydrophilic matrix polymers or matrix polymers having a relatively low degree of coalescence may help to render diffusion control layers hereof initially permeable to alkali while remaining impermeable to materials soluble in or solubilized by an aqueous alkaline processing composition, e.g., image dye-providing materials, until β-elimination occurs, thus providing functionality to such layers as interlayers or overcoat layers in photosensitive elements and negative components of diffusion transfer film units.

Utilization of matrix polymers may thus provide an alternative or complementary means to the above mentioned use of suitable comonomers in the β-elimination copolymers hereof as a method of modulating the hold time or functionality of the diffusion control layers of this invention. It will be understood, however, that the β-elimination reaction is necessary to achieve the relatively rapid change in permeability of the layer.

Matrix/β-elimination polymer systems adapted to utilization in a diffusion control layer may be prepared by physical mixing of the respective polymers, or by preparation of the matrix polymer in the presence of the β-elimination polymer. As disclosed in the copending U.S. patent application Ser. No. 130,532, of Charles Sullivan, filed of even date and now U.S. Pat. No. 4,297,431, issued Oct. 27, 1981, a preferred matrix/β-elimination polymer system comprises the system whereby a β-elimination polymer is formed in the presence of a preformed matrix polymer. Polymers which may be used as matrix polymers will generally be copolymers which comprise comonomeric units such as acrylic acid; methacrylic acid; methylmethacrylate; 2-acrylamido-2-methylpropane sulfonic acid; acrylamide; methacrylamide; N,N-dimethylacrylamide; ethylacrylate; butylacrylate; diacetone acrylamide; acrylamido acetamide; and methacrylamido acetamide. The comonomeric units, as well as the ratios thereof, should be chosen on the basis of the physical characteristics desired in the matrix polymer and in the diffusion control layer in which it is to be utilized. For example, a more hydrophilic and thus a generally more permeable matrix material can be had by increasing the respective ratio of hydrophilic comonomers, such as acrylic acid or methacrylic acid, within the matrix polymer.

Matrix polymer/β-elimination polymer systems useful in the present invention include those listed below wherein DAA designates diacetone acrylamide, BA designates butyl acrylate, AA designates acrylic acid, AMPS designates 2-acrylamido-2-methylpropane sulfonic acid, and CEAMA designates β-cyanoethyl-N-acrylyl-2-methylalanine. The matrix system listed below were prepared by polymerization of the β-elimination polymer in the presence of the preformed matrix polymer. All ratios and proportions are in parts by weight:

| Matrix System | Matrix polymer/β-elimination polymer |
|---|---|
| A | 55.5 parts of a 96/3/1 matrix copolymer of DAA/AA/AMPS and 45.5 parts of poly (CEAMA) |
| B | 55.5 parts of a 50/45.5/3.5/1 matrix copolymer of BA/DAA/AA/AMPS and 45.5 parts of poly (CEAMA) |
| C | 61 parts of a 45/51/3/1 matrix copolymer of BA/DAA/AA/AMPS and 39 parts of poly (CEAMA) |
| D | 70 parts of a 51.5/44/4.0/0.5 matrix copolymer of DAA/BA/AA/AMPS and 30 parts of poly (CEAMA) |
| E | 75 parts of a 51.5/44.0/4.25/0.25 matrix copolymer of DAA/BA/AA/AMPS and 25 parts of poly (CEAMA) |
| F | 75 parts of a 51.5/44.0/4.25/0.25 matrix copolymer of DAA/BA/AA/AMPS and 25 parts of a 65/34/1 β-elimination copolymer of CEAMA/DAA/AMPS |
| G | 75 parts of a 51.5/44.0/4.0/0.5 matrix copolymer of DAA/BA/AA/AMPS and 25 parts of a 64.5/34.0/1.5 β-elimination copolymer of CEAMA/DAA/AMPS |
| H | 60 parts of a 51.5/44/4.0/0.5 matrix copolymer of DAA/BA/AA/AMPS and 40 parts of a 99/1 β-elimination copolymer of CEAMA/AMPS |
| I | 70 parts of a 50.75/44/4.75/0.5 matrix copolymer of DAA/BA/AA/AMPS and 30 parts of a 64.5/34/1.5 β-elimination copolymer of CEAMA/DAA/AMPS |

The novel polymers hereof can be utilized in a number of diffusion transfer products and processes based upon imagewise transfer of a diffusible image-providing material, e.g., a diffusible dye, dye intermediate, or soluble silver complex. The diffusion transfer film units of the present invention comprise as essential layers, a support layer; at least one photosensitive silver halide emulsion layer having associated therewith a diffusion transfer process image-providing material; an alkaline processing composition permeable image-receiving layer; and at least one diffusion control layer comprising the novel polymers of this invention. Following photoexposure, the silver halide emulsion is developed with an aqueous alkaline processing composition and, as a function of development, an imagewise distribution of diffusible image-providing material is formed which is transferred, at least in part, to the superposed image-receiving layer. The diffusion control layers of such film units may be used to control diffusion of alkali or of the image-providing material in accordance with the disclosures contained herein.

Film units within the present invention include those wherein the silver halide emulsion layers and the image-receiving layer are initially contained in separate elements. Such film units may thus comprise: (a) a photosensitive element comprising a support layer which is preferably opaque and a negative component comprising at least one photosensitive silver halide emulsion layer having associated therewith a diffusion transfer process image-providing material; (b) an image-receiving element comprising a support layer which may be opaque or transparent as appropriate for a given process and a positive component comprising an image-receiving layer; and (c) a diffusion control layer comprising the polymers of this invention in at least one of said photosensitive element or image-receiving element. The respective elements may be brought into superposition subsequent or prior to exposure. Subsequent to exposure, an aqueous alkaline processing composition is distributed between the superposed elements to initiate development. If the image-receiving element provides an opaque reflective background, the image formed may be viewed as a reflection print upon separation of the elements. By using a transparent image-receiving element, the resultant image may be viewed as a transparency upon separation of the elements. Alternatively, if the photosensitive element and/or processing composition contains a light reflecting layer, e.g., a white pigment such as titanium dioxide, the image may be viewed as a reflection print against the background provided by the light-reflecting layer, without separation of the elements. The photosensitive element may also comprise a neutralization layer, e.g., an acid polymer layer, and a timing layer positioned between the support layer and the negative component with the neutralization layer positioned adjacent the support. By conduct of a neutralization reaction between the acid-reactive sites of the neutralization layer and the alkali provided by the processing composition the environmental pH of the film unit may be lowered, thus providing benefits detailed hereinbelow. The timing layer functions to prevent premature pH reduction by slowing diffusion of the alkali toward the neutralization layer.

The diffusion control layers of this invention can also be used in diffusion transfer film units wherein the photosensitive layers and image-receiving layer are in a single element, i.e. integral negative-positive film units wherein the negative and positive components are contained in a photosensitive laminate or otherwise retained together in a superposed relationship at least prior to exposure. For example, the diffusion control layers herein can be used in integral film units of the type described in detail in U.S. Pat. No. 3,415,644, which film units are particularly adapted for formation of color images. In accordance with the disclosures therein, film units of this type within the present invention comprise: (a) a photosensitive laminate comprising a composite structure containing, in sequence, an opaque support layer, preferably an actinic radiation-opaque flexible sheet material, a negative component comprising at least one photosensitive silver halide emulsion layer having associated therewith an image dye-providing material, a positive component comprising an image-receiving layer dyeable by the image dye-providing material, and a transparent support layer, preferably an actinic radiation transmissive flexible sheet material, the photosensitive laminate also comprising a diffusion control layer comprising the polymers of the present invention; (b) means retaining an aqueous alkaline processing composition integrated with the film unit so that the processing composition can be distributed between the negative and positive components. In this type of film unit a light-reflecting pigment is preferably provided by the processing composition such that the distribution of the processing composition between the negative and positive components provides a light-reflecting layer against which a dye image formed in the image-receiving layer can be viewed without separation of the components.

The diffusion control layers of this invention can also be used in integral negative-positive film units of the type described in U.S. Pat. No. 3,594,165. In accordance with the disclosures therein, film units of this type within the present invention comprise: (a) a photosensitive laminate comprising, in sequence, a transparent support layer, preferably an actinic radiation transmissive flexible sheet material, a positive component comprising an image-receiving layer, a processing composition permeable, light-reflecting layer against which a dye image formed in the image-receiving layer can be viewed, and a negative component comprising at least one photosensitive silver halide emulsion layer having associated therewith an image dye-providing material; (b) a transparent sheet superposed substantially coextensive the surface of the photosensitive laminate opposite the transparent layer; (c) means retaining an aqueous alkaline processing composition, which includes an opacifying agent, integrated with the film unit such that the processing composition can be distributed between the photosensitive laminate and the transparent sheet; and (d) a diffusion control layer comprising a polymer of the present invention, which layer may be a component of the photosensitive laminate or a coating on that side of the transparent sheet contiguous the photosensitive laminate. Color images formed within the image-receiving layer can be viewed against the background of the light-reflecting layer without separation of the transparent sheet from the photosensitive laminate.

Multicolor images may be prepared in the film units of the present invention which comprise at least two selectively sensitized silver halide emulsion layers, each associated with an image dye-providing material which provides an image dye possessing spectral absorption characteristics substantially complementary to the predominant sensitivity range of its associated emulsion. The most commonly employed negative components for forming multicolor images are of the tripack structure and contain blue, green, and red sensitive silver halide layers each having associated therewith in the same or a contiguous layer a yellow, a magenta, and a cyan image dye-providing material respectively. It is preferred that each of the silver halide emulsion layers, and its associated image dye-providing material, be spaced from the remaining emulsion layers, and their associated image dye-providing materials, by separate alkaline solution permeable interlayers, such as those provided by the instant invention.

As disclosed in U.S. Pat. No. 2,983,606 and a number of other patents, image dye-providing materials which are particularly useful in forming color images by diffusion transfer are the dye developers, i.e., compounds which contain, in the same molecule, both the chromophoric system of a dye and also a silver halide developing function. In a typical diffusion transfer system, each dye developer is associated with a separate silver halide emulsion layer and is, most preferably, substantially soluble in the reduced form only at the first pH provided by the processing composition, possessing subsequent to photoexposure or processing a spectral absorption range substantially complementary to the predominant sensitivity range of its associated emulsion. Following photoexposure, the processing composition is applied and permeates the emulsion layers to initiate development of the latent image contained therein. The dye developer is immobilized or precipitated in exposed areas as a consequence of the development of the latent image. In unexposed and partially exposed areas of the emulsion, the dye developer is unreacted and diffusible and thus provides an imagewise distribution of unoxidized dye developer dissolved in the liquid processing composition, as a function of the point-to-point degree of exposure of the silver halide emulsion. At least part of this imagewise distribution of unoxidized dye developer is transferred, by imbibition, to a superposed image-receiving layer, said transfer substantially excluding oxidized dye developer. The image-receiving layer receives a depthwise diffusion, from the developed emulsion, of unoxidized dye developer without appreciably disturbing the imagewise distribution thereof to provide the reversed or positive color image of the developed image. The image-receiving layer may contain agents adapted to mordant or otherwise fix the diffused, unoxidized dye developer. Subsequent to substantial transfer image formation, it is preferred that the environmental pH of the film unit be adjusted downward to a second pH at which the residual dye developers remaining within the negative structure are precipitated or otherwise rendered non-diffusible in either their reduced or oxidized state. The pH adjustment is generally accomplished by means of an acid neutralization layer, preferably a polymeric acid layer, as detailed hereinbelow.

For purposes of illustration, the present invention will hereinafter be described in terms of dye developers which function as described above, although no limitation of the invention to the illustrative image dye-providing materials is intended.

As illustrated in the accompanying drawings, FIG. 1 sets forth a perspective view of an integral film unit of the type described in referenced U.S. Pat. No. 3,415,644, shown with the processing composition 26 distributed between the negative and positive components. Film unit 10 comprises photosensitive laminate 11 including in order, opaque support layer 12; cyan dye developer layer 13; red-sensitive silver halide emulsion layer 14; interlayer 15; magenta dye developer layer 16; green-sensitive silver halide emulsion layer 17; interlayer 18; yellow dye developer layer 19; blue-sensitive silver halide emulsion layer 20; overcoat layer 21; image-receiving layer 22; spacer layer 23; neutralizing layer 24; and transparent support layer 25. Following photoexposure through transparent support layer 25, processing composition 26, initially retained in a rupturable container (not shown) is distributed between overcoat layer 21 and image-receiving layer 22 to initiate development of the silver halide emulsion layers. It is preferred that processing composition 26 contains an opacifying agent of the type described for example, in U.S. Pat. No. 3,647,437, such that the layer of processing composition 26 is able to prevent further exposure of the photosensitive layers of the film unit during the processing of the film unit outside of the camera. As a consequence of development, an imagewise distribution of diffusible dye developer is formed which is transferred, at least, in part to image-receiving layer 22. The layer provided by processing composition 26 preferably comprises a light-reflecting pigment, such as titanium dioxide, against which the color image formed in image-receiving layer 22 can be viewed. Subsequent to substantial transfer image formation, a sufficient portion of the alkali provided by processing composition 26 permeates image-receiving layer 22 and spacer layer 23 to gain access to neutralizing layer 24 whereupon neutralization of the alkali occurs to lower the pH of the system to a level at which the dye developers are insoluble and non-diffusible, to provide thereby a stable color transfer image.

Rather than being positioned between image-receiving layer 22 and support layer 25, spacer layer 23 and neutralizing layer 24 may be disposed intermediate support layer 12 and cyan dye developer layer 13, with neutralizing layer 24 positioned adjacent to support layer 12. In this embodiment, the alkali provided by processing composition 26 permeates layers 13 through 21 and spacer layer 23 to gain access to neutralizing layer 24 whereupon neutralization of the alkali is effected as described hereinabove.

With multicolor diffusion transfer products such as those described above, undesirable inter-image effects may occur whereby a given dye developer or other image dye-providing material is controlled as a result of association with a silver halide emulsion layer other than the one with which it was initially associated in the film unit. This unintended associative relationship generally results from migration of the image dye-providing material to a silver halide layer other than the one with which it is initially associated prior to development of this "wrong" emulsion layer. As a result of this premature migration, the image dye-providing material may acquire diffusion characteristics opposite to those it would normally possess had it remained in association with its intended controlling silver halide layer. For example, if a dye developer prematurely migrates to a silver halide layer other than the one with which it is initially associated, it may undergo oxidation to a non-diffusible species as a function of the development of this "wrong" layer and will be rendered incapable of transferring as intended to the image-receiving layer. As a result, accuracy in color reproduction and color saturation within the transfer image will be adversely affected. In addition, a portion of a second dye developer which should have undergone oxidation as a function of the development of this "wrong layer" remains in a reduced and diffusible state and, thus, may transfer to contaminate the resultant color transfer image. These inter-image effects may be more specifically exemplified by reference to FIG. 1. If it is possible for the magenta dye-developer of layer 16 to back-diffuse to red sensitive silver halide emulsion layer 14 before substantial development of this layer and resultant substantial formation of an imagewise distribution of the cyan dye developer in layer 13, some of the magenta dye developer may become oxidized and rendered non-diffusible as a function of red exposure and development of the red sensitive emulsion layer. Thus, there is produced a loss in magenta dye density in the transfer image. Moreover, that portion of cyan dye developer which should have been oxidized in preference to the magenta dye developer remains in the reduced form and may diffuse to image-receiving layer 22 with resultant cyan dye contamination of the transfer image. Thus, accurate color reproduction of a photographed object is hindered by such inter-image effects.

To obviate or minimize inter-image effects, diffusion control layers hereof may be employed as interlayers positioned between the respective silver halide layers, and their associated dye developers, such as interlayers 15 and 18 in FIG. 1. The β-elimination step undergone by the β-elimination polymer(s) within these layers ensures a delay in permeability of these layers during initial processing of the film unit and thus "holds" the dye developer and substantially prevents diffusion to unassociated silver halide layers at least until after substantial development of these layers and formation of the intended imagewise distributions of the dye developers. The "release" of the diffusible dye developers should occur prior to substantial fogging of the emulsion layer with the most rapid fogging rate. It will be appreciated that the "hold-release" behavior of the interlayers of this invention provides advantages over those interlayers which allow a slow leaking of dye developer at the start of the processing interval in that the dye developers are better confined to their associated emulsion layer during the critical initial development interval and then released rapidly and in substantial quantity so as to allow rapid and essentially simultaneous transfer of the color image-forming materials.

In addition to minimizing the above described inter-image effects, interlayers comprising the polymers of this invention may be used to provide increased capacity for accurate color reproduction over a range of temperatures. In general, the lowering of the temperature at which processing occurs slows both the rate of development and the rate of dye diffusion. If the respective rates are slowed disproportionately, i.e., if the decrease in the development rate is proportionately greater than the decrease in the rate of diffusion, color reproduction may be adversely affected by diffusion of the dye away from its associated emulsion layer prior to substantial development of that layer. This type of premature migration may be minimized by use of interlayers comprising the polymers of this invention which have been found to provide markedly longer "hold" times at lower temperatures, e.g., 7° C. relative to the "hold" time observed at higher temperatures, e.g., 24° C. Thus, the interlayers may be utilized to hold the dye developer in association with the silver halide emulsion for longer time periods at lower temperatures to accommodate the system to slower development rates at these temperatures while allowing for a proportionately faster "release " as the temperature and development rate increase.

The polymers of this invention useful as interlayer materials as described hereinabove may also be utilized in overcoat layers of photosensitive elements or negative component overcoat layers such as overcoat layer 21 in FIG. 1. Such overcoat layers may be used, for example, to prevent premature migration of the dye developer most proximate to the distributed processing composition or to provide a means by which the various color image-forming materials may be made available essentially simultaneously to the mordant sites within the image-receiving layer.

The processing compositions employed in diffusion transfer processes of the type contemplated herein usually are highly alkaline, having a pH in excess of 12 and frequently in excess of 14 or higher. In general, the highly alkaline environment facilitates the conduct of dye diffusion to provide satisfactory diffusion rates and image dye densities. As disclosed in U.S. Pat. No. 3,362,819 it is highly desirable that the environmental pH of the film unit be lowered to at least 11 or lower subsequent to substantial transfer image formation to achieve improved stability of the dye image. U.S. Pat. No. 3,415,644 discloses that in integral film units wherein the negative and positive components remain in a superposed contiguous relationship subsequent to substantial transfer image formation, an in-process adjustment of the environmental pH of the film unit from a pH at which transfer processing is operative to a pH at which dye transfer is inoperative subsequent to substantial transfer image formation is highly desirable in order to achieve a more stable dye transfer image in terms of the chemical and light stability of the image dye molecules and in terms of preventing post-processing transfer of residual image dye-providing materials within the negative structure to the image-receiving layer.

As disclosed in previously referenced U.S. Pat. No. 3,362,819, reduction in the environmental pH of the film unit is preferably achieved by conduct of a neutralization reaction between the alkali provided by the processing composition and a layer comprising immobilized acid reactive sites, i.e., a neutralization layer. Preferred neutralization layers are those comprising a polymeric acid such as cellulose acetate hydrogen phthalate; polyvinyl hydrogen phthalate; polyacrylic acid; polystyrene sulfonic acid; and partial esters of polyethylene/maleic anhydride copolymers.

Premature pH reduction, as evidenced, for example, by a decrease in image dye density, may be prevented by disposing intermediate the neutralization layer and the distributed processing composition a spacer or timing layer which slows diffusion of the alkali toward the neutralization layer. As indicated hereinabove, diffusion control layers of this invention may be used as such timing layers, forming an alkali impermeable barrier for a predetermined time interval and then converting to a relatively alkali permeable condition upon occurrence of β-elimination to allow the alkali access to the neutralization layer in a rapid and quantitatively substantial fashion.

The timing layers comprising the β-elimination polymers hereof may be used in image-receiving elements of the type disclosed in U.S. Pat. No. 3,362,819 or as a component part of the positive component of integral negative-positive film units of the type disclosed in previously referenced U.S. Pat. Nos. 3,415,644 and 3,594,165. Alternatively, the timing and neutralization layers may be associated with the negative component as is disclosed, for example, in U.S. Pat. Nos. 3,362,821 and 3,573,043. In film units of the present invention of the type disclosed in referenced U.S. Pat. No. 3,594,165, these layers may also be carried by the transparent sheet employed to facilitate application of the processing composition.

Figure 2:
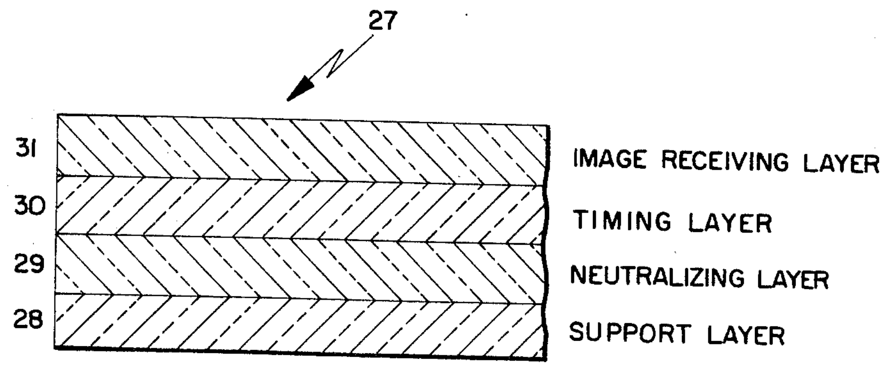
FIG. 2 is a cross-sectional view of an image-receiving element including a diffusion control timing layer of this invention.

Illustrated in FIG. 2 is an image-receiving element of the present invention. Image-receiving element 27 comprises in order a support layer 28, a neutralizing layer 29, a spacer or timing layer 30 comprising a β-elimination polymer of the present invention, and an image-receiving layer 31. During processing the image-receiving layer is situated contiguous the layer of processing composition. The processing composition penetrates image-receiving layer 31 to provide a sufficient pH for image formation therein and is then subsequently neutralized by penetrating through timing layer 30 upon β-elimination of the diffusion control polymer contained therein to gain access to neutralizing layer 29.

As indicated previously, the permeability of the diffusion control layers of this invention to alkali may be controlled in a predetermined manner by the use of comonomeric units which provide to the polymer a suitable hydrophilic/hydrophobic balance and/or a suitable degree of coalescence or by the use of a matrix material providing the required hydrophilicity or coalescence. In general, increased hydrophobicity and coalescence will render the diffusion control layer relatively less permeable to alkali and to the processing composition prior to the β-elimination reaction.

In a further embodiment of the present invention, an overcoat layer comprising the polymers hereof may be provided to the image-receiving element or positive component of the film unit contiguous the image-receiving layer and opposite the neutralization layer. Overcoat layers of this type in this position within the film unit may function to control diffusion of alkali or materials soluble in or solubilized by an aqueous alkaline processing composition.

The permeation characteristics of the polymers hereof utilized in timing layers can be evaluated by measuring the time necessary for downward adjustment of the environmental pH to a predetermined lower level as evidenced by color transition of an indicator dye, preferably initially contained in the processing composition, from a colored form at the initially high processing composition pH to a colorless form at said predetermined lower pH level. Evaluations of this type may be carried out utilizing a test structure comprising in order a support, a polymeric acid layer, a test timing layer, and an image-receiving layer. A transparent cover sheet is superposed coextensive the test structure contiguous to the image-receiving layer and an alkaline processing composition comprising an indicator dye which is highly colored at a pH of 12 or higher and colorless below a predetermined lower pH level of about 9 or 10 is spread between the cover sheet and the image-receiving layer. The indicator dye remains colored, and may be viewed as such through the transparent cover sheet, until the alkali penetrates through the test timing layer to gain access to the polymeric acid whereupon neutralization of a substantial portion of the alkali present occurs to lower the pH to a level at which the indicator dye is colorless. The measurement of the time necessary for substantial "clearing" of the indicator is generally referred to as the "clearing time". Test structures comprising timing layers which allow a slow initial leakage of alkali and gradually become more permeable show no precipitous change in color but rather a gradual clearing while structures comprising the timing layers described herein will show a precipitous change in color after an initial delay evidencing the rapid change in alkali permeability undergone by the timing layer upon β-elimination.

Figure 3:
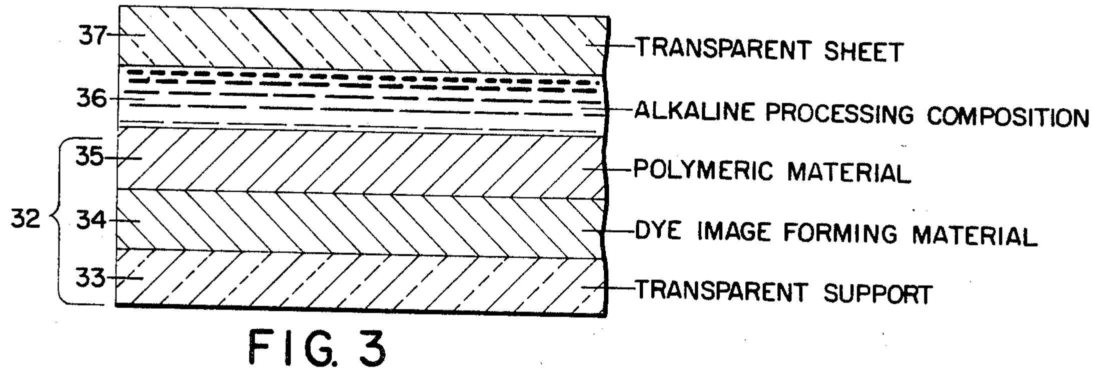
FIG. 3 illustrates a model arrangement for measuring the "hold-time" of interlayers of this invention.

The capacity of diffusion control layers comprising polymers hereof to delay permeation therethrough of dye image-providing materials until conversion by β-elimination to a relatively dye-permeable condition can be evaluated by utilization of the test structure shown in FIG. 3. In accordance with such structure, transfer of the image dye-providing material through the test diffusion control layer is monitored in relation to time. The "hold-release" properties of the $\beta$-elimination polymer test material can be evaluated in simulation of the functioning of the material, e.g., an interlayer in a photosensitive element. Such test structure and a suitable method of evaluation are set forth in detail in Examples 8 and 9 hereof.

The polymers of the instant invention may be prepared by reaction of acrylyl chlorides, anhydrides, or esters of the formulae

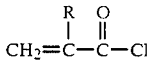

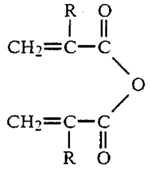

and

respectively, wherein R is as previously defined and $R^4$ is alkyl or aryl, with a primary or secondary amine of the formula

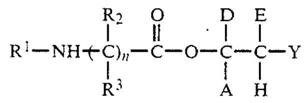

wherein $R^1$, $R^2$, $R^3$, A, D, E, Y and n are as previously defined, to form a polymerizable monomer of formula (III)

(III)

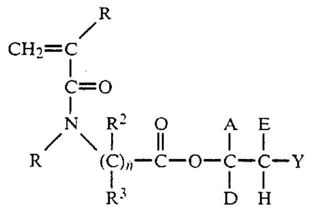

followed by polymerization to prepare the novel polymers hereof. When using the acrylyl chloride intermediate, the reaction may be facilitated by the presence of an acid acceptor. Preferred acid acceptors are weak bases which are substantially incapable of promoting $\beta$-elimination under the reaction conditions utilized. The use of a small amount of polymerization inhibitor, e.g., hydroquinone, may also be desirable in order to prevent premature polymerization. Monomers of formula (III) are novel compounds which can be polymerized to form the polymers of the present invention.

The polymers of this invention may also be prepared by reacting an N-acrylylamino acid of the formula

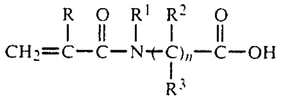

in known manner to form a mixed anhydride intermediate; reacting the mixed anhydride intermediate with a substituted ethanol of the formula

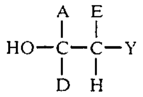

to form a monomer of formula (III) above; and polymerizing the monomer. The mixed anhydride intermediate may be formed, for example, by reaction of the N-acrylylamino acid with a carbodiimide such as dicyclohexylcarbodiimide or N-ethyl-N'-($\gamma$-dimethylaminopropyl)carbodiimide hydrochloride; an anhydride such as acetic anhydride or trifluoroacetic anhydride; an acid halide such as acetyl chloride; or an alkyl or benzyl haloformate such as ethyl chloroformate or benzyl chloroformate. The reaction of the substituted ethanol with the mixed anhydride may be facilitated by the presence of a 4-dialkylaminopyridine catalyst such as 4-(N,N-dimethylamino)pyridine or 4-pyrrolidinopyridine.

In preparing the preferred polymers of this invention, i.e., polymers of formula (II) above, by the method immediately above, the N-acrylylamino acid will be an N-acrylyl-$\alpha$-amino acid of the formula

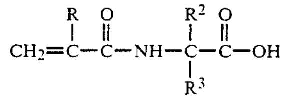

Rather than forming the mixed anhydride intermediate, such $\alpha$-amino acids may preferentially react in the presence of the above specified reagents to form a 2-alkenyl-5-oxazalone of the formula

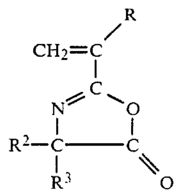

wherein R, $R^2$ and $R^3$ are as defined previously. For example, N-acrylyl-$\alpha$-amino acids may be reacted with alkyl haloformates such as ethyl chloroformate to prepare 2-alkenyl-5-oxazalones as described, for example, by Taylor et al., J. Polym. Sci. B, vol. 7, 597 (1969). Benzyl haloformates may also be so utilized. N-acrylyl-$\alpha$-amino acids may also be reacted with anhydrides such as acetic anhydride and trifluoroacetic anhydride to undergo a cyclodehydration reaction to form 2-alkenyl-5-oxazalones as described, for example, by J. W. Lynn in J. Org. Chem., 24, 1030 (1959) and in Brit. Pat. No. 1,121,418. Such oxazalones may also be prepared by reacting the N-acrylyl-$\alpha$-amino acid with a carbodiimide such as dicyclohexylcarbodiimide or N-ethyl-N'-

(γ-dimethylaminopropyl)carbodiimide hydrochloride. Formation of 5-oxazalones by this method is disclosed by Chen, et al., Synthesis, No. 3, p. 230, (1979).

As detailed in Examples 1 and 3 herein, 2-alkenyl-5-oxazalones may be derivatized by a substituted ethanol of the formula

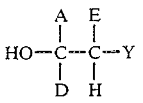

in accordance with the following reaction scheme (A):

(A)

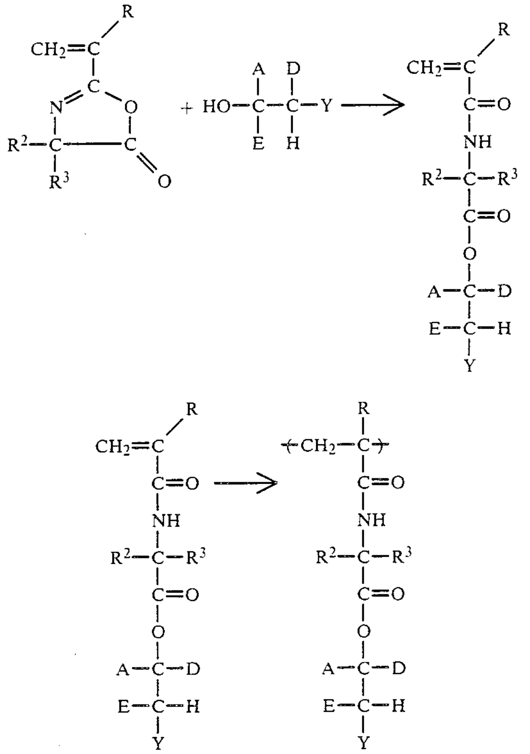

The reactivity of 5-oxazalone rings toward nucleophilic groups such as hydroxy groups is known. See, for example, U.S. Pat. No. 3,488,327 and previously referenced Brit. Pat. No. 1,121,418. In general, such reactions proceed readily and in high yield. However, it has been found that the reaction can be facilitated by use of a 4-dialkylaminopyridine catalyst such as 4-(N,N-dimethylamino)pyridine or 4-pyrrolidinopyridine as detailed in Example 1 herein.

In preparing the polymers hereof by use of a 2-alkenyl-5-oxazalone intermediate, it is preferred that the oxazalone be isolated and, if necessary, purified prior to reaction with the substituted ethanol. However, if such steps are impractical, e.g., if the oxazalone is highly reactive, it may be generated in an inert solvent and unreacted in situ to yield the desired monomer.

The derivatization of the oxazalone with the substituted ethanol can be conducted in inert solvents such as tetrahydrofuran, chloroform, dichloromethane, dimethylformamide, benzene, dioxane, toluene, acetone, methylethylketone, and ethyl acetate. The reaction may be conducted over a temperature range of about 0° C. to about 100° C. and preferably about 15° C. to about 35° C. It has been found that the reaction proceeds with facility at ambient temperatures of about 25° C. in the presence of the above mentioned 4-dialkylaminopyridine catalysts. It is preferred that a small amount of polymerization inhibitor such as hydroquinone or t-butylpyrocatechol also be present during the derivatization reaction.

The monomers prepared by any of the above methods may be polymerized according to different polymerization techniques such as bulk, solution, suspension, or emulsion polymerization. In addition, the polymerization may be conducted in the presence of other suitable polymers, i.e. a polymeric matrix material, to prepare a matrix system which may be used as a diffusion control layer. The polymerization can be initiated chemically, e.g., by suitable free radical or redox initiators or by other means such as heat or incident radiation. As examples of chemical initiators, mention may be made of azobisisobutyronitrile, potassium persulfate, sodium bisulfite, benzoyl peroxide, diacetyl peroxide, hydrogen peroxide, and diazoaminobenzene. It will be appreciated that the chosen means of initiation should be substantially incapable of degrading or otherwise adversely reacting with either the reactants or products of the reaction. The amount of catalyst used and the reaction temperature may be varied to suit particular needs. Generally, the polymerization should proceed satisfactorily by carrying out the reaction at a temperature between 25° C. and 100° C. and using less than 5% by weight of initiator, based on the starting weight of the polymerizable monomer or monomers.

The preferred polymers of the present invention can also be prepared by derivatization of a polymeric 5-oxazalone in accordance with the following reaction scheme (B):

(B)

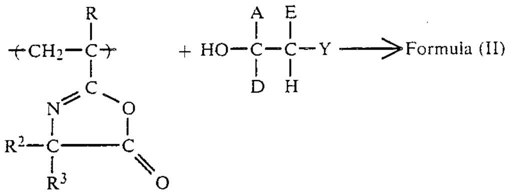

Reaction scheme (B) provides a uniquely advantageous method by which the substituted ethanol may be directly attached to an existing polymer backbone. The method of attachment is an addition reaction which does not result in formation of deleterious by-products such as neighboring reactive pendant groups which might adversely affect either the stability of the pendant group formed by reaction scheme (B) or the rate of β-elimination.

The polymeric 5-oxazalones utilized in reaction scheme (B) may be prepared by polymerization of the 2-alkenyl-5-oxazalones utilized in reaction scheme (A). As disclosed, for example, by Taylor, et al., J. Polym. Sci., B, vol. 9, 187 (1971), in preparing polymeric oxazalones by polymerization of 2-alkenyl-5-oxazalones, undesirable rearrangements may be minimized and a higher yield of purer, more stable polymer obtained if the substituents at the 4- position of the oxazalone ring ($R^2$ and $R^3$ herein) are other than hydrogen. Thus, with respect to reaction scheme (B), $R^2$ and $R^3$ are preferably other than hydrogen. Preferred substituents $R^2$ and $R^3$ are alkyl groups. Most preferably, each of $R^2$ and $R^3$ is methyl. Illustrative polymerization techniques are described, for example, in the Taylor, et al. article referenced immediately above, by Iwakura, et al., J. Polym. Sci., A-1, vol. 6, 2681 (1968), and in previously referenced U.S. Pat. No. 3,488,327 and Brit. Pat. No. 1,121,418.

2-Alkenyl-5-oxazalones can be homopolymerized or copolymerized with other ethylenically unsaturated monomers for purposes of imparting predetermined physical properties to the $\beta$-elimination polymer ultimately formed by reaction scheme (B). Alternatively, predetermined physical properties may be imparted to the polymer by derivatization of the polymeric 5-oxazalone with nucleophilic compounds which, when so introduced into the polymer, will impart thereto the desired properties. For example, the hydrophobicity of the polymer may be increased by introduction of a relatively hydrophobic alkyl group, e.g., n-butyl, into the polymer by means of derivatization with a corresponding alkyl amine or alcohol, e.g., n-butyl amine or n-butanol. The derivatization with such nucleophilic compounds can be conducted concurrently with the derivatization with the substituted ethanol or the respective derivatization reactions may be conducted sequentially.

Derivatization of the polymeric oxazalone in accordance with reaction scheme (B) is preferably conducted in the presence of a suitably inert and substantially anhydrous solvent such as tetrahydrofuran, benzene, toluene, dioxane, ethyl acetate, methylethylketone, chloroform, and dichloromethane. Similar to reaction scheme (A) the derivatization reaction may be facilitated by the presence of a 4-dialkylaminopyridine catalyst.

The present invention is further illustrated in the following Examples which are illustrative only and not intended to be of limiting effect.

EXAMPLE 1

Preparation of $\beta$-cyanoethyl-N-acrylyl-2-methylalanine

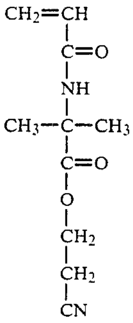

A solution of 111.2 grams of 2-vinyl-4,4-dimethyl-5-oxazalone in 400 milliliters of dry tetrahydrofuran was added to a stirring solution of 56.8 grams of 2-cyanoethanol and 40 milligrams of t-butylpyrocatechol in 400 milliliters of dry tetrahydrofuran at 10° C., followed by addition of 960 milligrams of 4-(N,N-dimethylamino)-pyridine. The mixture was stirred at ambient temperature of about 25° C. for 3 days. About 1 milliliter of glacial acetic acid was then added and the mixture rotary evaporated at room temperature. The residue was dissolved in 900 milliliters of dichloromethane, the solution extracted with 500 milliliters of a saturated sodium chloride solution, and then dried over sodium sulfate. Evaporation of the dichloromethane yielded a white solid. The solid was suspended in 600 milliliters of dry hexanes, mixed, filtered, washed with dry hexanes, and dried at ambient temperature and reduced pressure giving 115.5 grams of the desired product as a white solid with a melting point of 70°-72° C. Structure was confirmed by infrared and nuclear magnetic resonance analysis.

EXAMPLE 2

Alternative preparation of $\beta$-cyanoethyl-N-acrylyl-2-methylalanine:

To an ice cold solution of 103 grams of dicyclohexylcarbodiimide in one liter of dry methylene chloride was added 78.5 grams of N-acrylyl-2-methylalanine, followed by addition of 200 milliliters of dry methylene chloride. The mixture was stirred for one-half hour under a dry nitrogen atmosphere at about 0° C. and then allowed to warm to ambient temperature of about 25° C. over one hour. The mixture was then vacuum filtered and 35.5 grams of 2-cyanoethanol, 610 milligrams of 4-(N,N-dimethylamino)pyridine and 30 milligrams of t-butylpyrocatechol were added to the filtrate. The solution was stirred under a nitrogen atmosphere at ambient temperature for 3 days, extracted with a saturated sodium chloride solution, and then dried over sodium sulfate. The solution was then treated with Norite activated charcoal, filtered, and the solvent evaporated on a rotary evaporator. The residue was dissolved in 600 milliliters of ethylacetate, filtered, and the filtrate concentrated to 300 milliliters, followed by addition of 500 milliliters of dry hexanes. The crystallized white solid was collected and washed with dry hexanes and dried at ambient temperature and reduced pressure to yield 56 grams of the desire product having a melting point of 70°-72° C.

EXAMPLE 3

Preparation of $\beta$-(methylsulfonyl)ethyl-N-acrylyl-2-methylalanine:

122 Milligrams of 4-(N,N-dimethylamino)pyridine were added to a stirring mixture of 13.9 grams of 2-vinyl-4,4-dimethyl-5-oxazalone and 12.4 grams of 2-(methylsulfonyl) ethanol in 100 milliliters of dry tetrahydrofuran and the mixture stirred at ambient temperature of about 25° C. for two days. One drop of glacial acetic acid was then added and the solvent removed by rotary evaporation at ambient temperature. The residue was dissolved in 150 milliliters of dichloromethane and the solution extracted twice with a saturated sodium chloride solution and then dried over sodium sulfate. The dichloromethane was removed by rotary evaporation at room temperature and the residue slurried with dry hexanes, filtered, and dried at ambient temperature and reduced pressure to yield 12.8 grams of the desired product as a white solid having a melting point of 97°-99° C. Structure was confirmed by infrared and nuclear magnetic resonance analysis.

EXAMPLE 4

Preparation of a copolymer consisting of 97 parts by weight of $\beta$-cyanoethyl-N-acrylyl-2-methylalanine and 3 parts by weight of acrylic acid:

A mixture of 1.5 grams of $\beta$-cyanoethyl-N-acrylyl-2-methylalanine, 46 milligrams of acrylic acid, 64 milligrams of a 16.4% by weight dialized Dowfax solution (Dowfax 2A1 solution available from Dow Chemical Co., Midland, Mich.), and 10 milliliters of water was heated to 80° C. under a nitrogen atmosphere. To this mixture was added a solution of 2.1 milligrams of sodium hydrosulfite in 1.7 milliliters of water followed by addition of 5.5 milligrams of potassium persulfate in 2 milliliters of water. The reaction mixture was maintained at 80°-85° C. for 2 hours, cooled to room temperature, and neutralized to pH 7.0 by addition of a 2% by weight potassium hydroxide solution. Yield of 15.2 grams of polymer emulsion product having a solids concentration of 10.2% by weight.

EXAMPLE 5

Preparation of a copolymer consisting of 96 parts by weight of β-cyanoethyl-N-acrylyl-2-methylalanine, 3 parts by weight of acrylic acid, and 1 part by weight of 2-acrylamido-2-methylpropane sulfonic acid:

A mixture of 0.6 milligrams of ferrous sulfate heptahydrate, 0.5 grams of an 18.3% by weight dialized Dowfax solution, and 72.5 milliliters of water was heated to 90° C. under a nitrogen atmosphere and to this mixture were added simultaneously, in separate streams, over a period of one hour:

(a) a mixture of 28.8 grams of β-cyanoethyl-N-acrylyl-2-methylalanine, 0.9 grams of acrylic acid, 0.3 grams of 2-acrylamido-2-methylpropanesulfonic acid, 0.66 grams of an 18.3% by weight dialized Dowfax solution, and 78 milliliters of water;

(b) a solution of 0.11 grams of potassium persulfate in 10 milliliters of water; and (c) a solution of 0.041 grams of sodium bisulfite in 10 milliliters of water.

Yield of 202 grams of polymer emulsion product having a solids concentration of 15% by weight.

EXAMPLE 6

Preparation of a copolymer consisting of 90 parts by weight of diacetone acrylamide, 9 parts by weight of β-(methylsulfonyl)ethyl-N-acrylyl-2-methylalanine, and 1 part be weight of 2-acrylamido-2-methylpropanesulfonic acid:

A mixture of 0.8 milligrams of ferrous sulfate heptahydrate, 0.6 grams of an 18.3% by weight dialized Dowfax solution, and 50 milliliters of water was heated to 90° C. under a nitrogen atmosphere and to this mixture were added simultaneously, in separate streams, over a period of 1½ hours:

(a) a mixture of 32.6 grams of diacetone acrylamide, 3.26 grams of β-(methylsulfonyl)ethyl-N-acrylyl-2-methylalanine, 0.36 grams of 2-acrylamido-2-methylpropane sulfonic acid, 0.79 grams of an 18.3% by weight dialized Dowfax solution, 2.0 grams of a 1N. solution of triethanolamine, and 75.6 milliliters of water;

(b) a solution of 0.13 grams of potassium persulfate in 20 milliliters of water; and (c) a solution of 0.05 gram of sodium bisulfite in 20 milliliters of water.

Following completion of the additions, the mixture was maintained at 90° C. for 2 hours. Yield of 205 grams of polymer emulsion product having a solids concentration of 18% by weight.

EXAMPLE 7

Preparation of a matrix system comprising a matrix terpolymer consisting of 51.5 parts by weight of diacetone acrylamide, 44.0 parts by weight of butyl acrylate, 4.0 parts by weight of acrylic acid, and 0.5 parts by weight of 2-acrylamido-2-methylpropane sulfonic acid and a β-elimination copolymer consisting of 99 parts by weight of β-cyanoethyl-N-acrylyl-2-methylalanine and 1 part by weight of 2-acrylamido-2-methylpropane sulfonic acid wherein the ratio by weight of matrix polymer to β-elimination polymer is 60:40:

A mixture of 0.015 grams of ferrous sulfate heptahydrate, 4.2 grams of a 20.6% by weight dialyzed Dowfax solution, 5.6 grams of a 100% solution of Triton X-100 (available from Rohm and Haas Corp., Philadelphia, Pa.) and 4.2 liters of water was heated to 90° C. under a nitrogen atmosphere and to this mixture were added simultaneously, in separate streams, over a period of two hours:

(a) a mixture of 721 grams of diacetone acrylamide, 56 grams of acrylic acid, 7 grams of 2-acrylamido-2-methylpropane sulfonic acid, 27.2 grams of a 20.6% by weight dialized Dowfax solution; and 1.4 liters of water;

(b) 616 grams of butylacrylate;

(c) a solution of 5.1 grams of potassium persulfate in 300 milliliters of water; and (d) a solution of 1.9 grams of sodium bisulfite in 300 milliliters of water.

Following completion of the additions, the mixture was maintained at 90° C. for one hour. The temperature was then lowered to 80° C. and 91 grams of 2N. triethanolamine were added over one-half hour. To the resultant mixture were added simultaneously, in separate streams, over one hour:

(e) a mixture of 905 grams of β-cyanoethyl-N-acrylyl-2-methylalanine, 9.0 grams of 2-acrylamido-2-methylpropane sulfonic acid, 5.9 grams of 20.6% dialized Dowfax solution, 34 grams of 1N. triethanolamine and 20 milliliters of water;

(f) a solution of 1.98 grams of potassium persulfate and 3.0 grams of Triton X-100 in 225 milliliters of water; and (g) a solution of 1.21 grams of sodium bisulfite in 225 milliliters of water.

Following completion of these additions, the temperature of the mixture was maintained at 85° C. for three hours. Yield of 8935 grams of a matrix system having a solids concentration of 26% by weight.

EXAMPLE 8

The β-elimination polymers were evaluated using a test structure, 32 in FIG. 3, comprising a transparent support 33, a layer 34 comprising about 215 mg./$m^2$ of a cyan dye developer of the formula

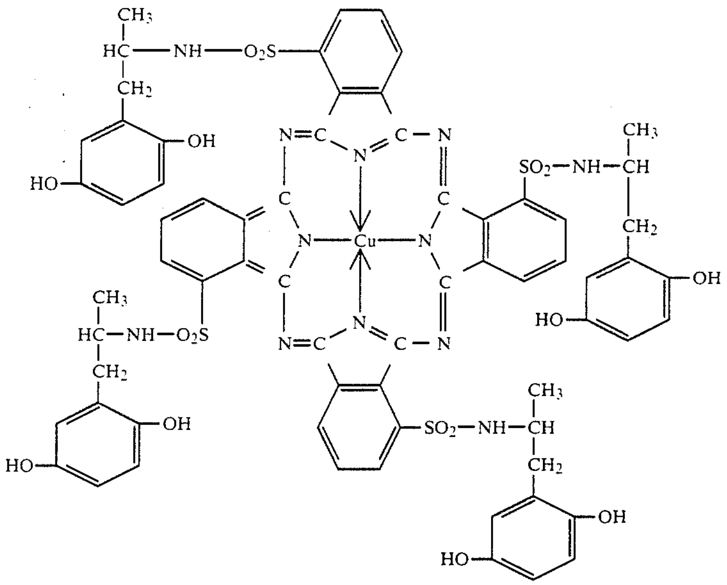

about 430 mg./m.[2] gelatin, and about 16 mg./m.[2] of succinaldehyde and a layer 35 containing about 2150 mg./m.[2] of the polymeric material. Layers 34 and 35 were coated sequentially on support 33 using a conventional loop coater.

Figure 4:
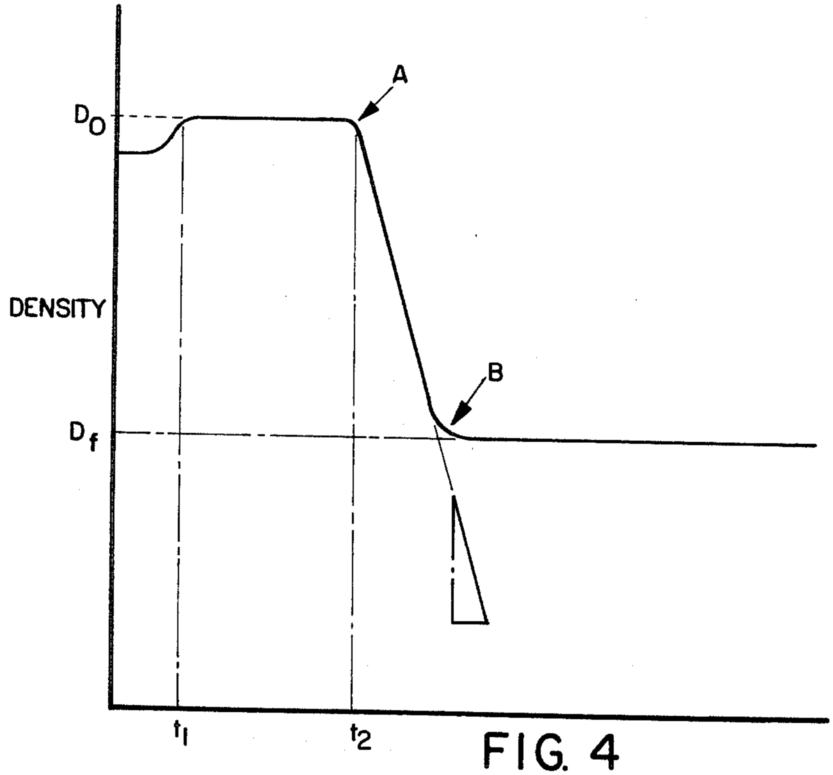
FIG. 4 is a graphical depiction of dye density as a function of time in a system including an interlayer of the present invention.

A transparent sheet 37 comprising a polyester clear film base was superposed with test structure 32 and an opaque alkaline processing composition 36 comprising:

| | |
|---|---|
| Potassium hydroxide (45% aqueous solution) | 23.94 g. |
| Benzotriazole | 1.33 g. |
| 6-Methyl uracil | 0.73 g. |
| Bis-(β-aminoethyl)-sulfide | 0.06 g. |
| Colloidal silica, aqueous dispersion ($30\%$ $SiO_2$) | 4.48 g. |
| Titanium dioxide | 92.12 g. |
| N—phenethyl α-picolinium bromide (50% aqueous solution) | 6.18 g. |
| N—2-hydroxyethyl-N,N'N'—triscarboxymethyl ethylene diamine | 1.82 g. |
| 4-Amino pyrazolo(3,4d)pyrimidine | 0.61 g. |
| Carboxymethyl hydroxyethyl cellulose | 4.82 g. |
| Water | 100 g. |

was introduced between polymeric test material layer 35 and transparent sheet 37 at a gap of 0.071 mm. Immediately after introduction of the processing composition the optical reflection density to red light of the sample was monitored through transparent support 33 as a function of time by use of a MacBeth Quanta-Log densitometer equipped with a strip-chart recorder. The density measured as a function of time was that of the cyan dye developer in the original dye-containing layer 34 and the cyan dye developer in polymer test layer 35. Dye developer which had diffused through test layer 35 into the processing composition was masked by the titanium dioxide contained therein and, thus, did not contribute to the red absorption. In this manner, the diffusion of dye developer through the test layer and into the processing composition could be monitored. A typical curve of red absorption density as a function of time is given in FIG. 4 wherein $t_1$ is the time for the cyan dye developer to become wetted by the processing composition, $t_2$ is the total time the cyan dye developer is held back by the polymer interlayer, $D_o$ is the absorption density after dissolution of the dye developer, and $D_f$ is the final absorption density of the residual dye developer remaining in layers 34 and 35 after completion of dye diffusion. The slope of the line segment between A and B was calculated and serves as an indication of the rapidity with which the test layer underwent a change in dye permeability.

In this Example, the polymer emulsion products prepared as described in Examples 4 and 5 herein were coated and evaluated as test layer 35 in the above described test structures. In Table 1, values for $t_1$ and $t_2$ in seconds and slope are given. Polymer compositions in this and the subsequent Example are presented in accordance with the comonomer designations utilized hereinabove and all ratios and proportions are by weight.

TABLE 1

| β-elimination polymer | $t_1$ | $t_2$ | slope |
|---|---|---|---|
| CEAMA/AA: 97/3 (Product of Example 4) | 6 | 18 | 356 |
| CEAMA/AA/AMPS: 96/3/1 (Product of Example 5) | 0 | 6 | 650 |

EXAMPLE 9

The test structures described in Example 8 were utilized to evaluate the matrix systems A through I described hereinabove. Values for $t_1$, $t_2$, and slope are presented in Table 2.

TABLE 2

| Matrix system | Polymeric composition | $t_1$ | $t_2$ | slope |
|---|---|---|---|---|
| A | 55.5 parts DAA/AA/AMPS: 96/3/1 and 45.5 parts poly(CEAMA) | 0 | 12 | 1070 |
| B | 55.5 parts BA/DAA/AA/AMPS: 50/45.5/3.5/1 and 45.5 parts poly (CEAMA) | 4.5 | 15 | 859 |
| C | 61 parts BA/DAA/AA/AMPS: 45/51/3/1 and 39 parts poly(CEAMA) | 4.0 | 18 | 916 |
| D | 70 parts DAA/BA/AA/ | 3.0 | 16.5 | 793 |

TABLE 2-continued

| Matrix system | Polymeric composition | $t_1$ | $t_2$ | slope |
|---|---|---|---|---|
| | AMPS: 51.5/44/4.0/ 0.5 and 30 parts poly(CEAMA) | | | |
| E | 75 parts DAA/BA/AA/ AMPS: 51.5/44/4.25/ 0.25 and 25 parts poly (CEAMA) | 0 | 13.5 | 841 |
| F | 75 parts DAA/BA/AA/ AMPS: 51.5/44/4.25/ 0.25 and 25 parts CEAMA/ DAA/AMPS: 65/34/1 | 0 | 19.5 | 783 |
| G | 75 parts DAA/BA/AA/ AMPS: 51.25/44/4.25/0.5 0.5 and 25 parts CEAMA/ DAA/AMPS: 64.5/34.0/1.5 | 1.8 | 19.8 | 613 |
| H | 60 parts DAA/BA/AA/ AMPS: 51.5/44/4.0/ 0.5 and 40 parts CEAMA/AMPS: 99/1 | 3.0 | 21 | 786 |
| I | 70 parts DAA/BA/AA/AMPS: 1.8 50.75/44/4.75/0.5 and 30 parts CEAMA/DAA/AMPS: 64.5/34/1.5 | 19.8 | 595 | |

The hold times $t_2$ of the above systems increase as processing temperature decreases, paralleling development time. For example, at 7° C. systems D, E and G and I above had respective hold times of 30, 18, 54, and 36 seconds with slopes of 93, 87, 110, and 64, respectively.

What is claimed is:

1. A polymer comprising recurring units of the formula

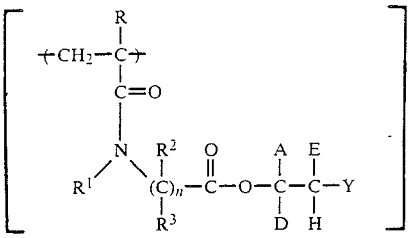

wherein R is hydrogen or lower alkyl; $R^1$ is hydrogen or lower alkyl; $R^2$ and $R^3$ can each independently be hydrogen, lower alkyl, substituted lower alkyl, aryl, alkaryl, aralkyl, cycloalkyl, or $R^2$ and $R^3$ together with the carbon atom to which they are bonded can constitute a carbocyclic or heterocyclic ring, or $R^3$, when substituted on the methylene carbon atom next adjacent the nitrogen atom, can be taken together with $R^1$ to form part of a substituted or unsubstituted N-containing ring; A, D, and E are selected from the group consisting of hydrogen, methyl, and phenyl, provided that no more than one of the A, D or E may be methyl or phenyl; Y is a β-elimination activating group which in an alkaline environment activates a β-elimination reaction; and n is a positive integer one to six.

2. A polymer of claim 1 wherein said activating group Y is selected from the group consisting of sulfones of the formula $—SO_2W$ wherein W is aryl, aralkyl, alkaryl, alkyl, alkoxy, amino, or substituted amino; carbonyl groups of the formula

wherein T is hydrogen, alkyl, alkoxy, amino, or substituted amino; sulfoxide groups of the formula

wherein G is aryl, alkyl, alkaryl, or aralkyl; and cyano.

3. A polymer of claim 1 wherein $R^1$ is hydrogen and n is one.

4. A polymer of claim 3 where R is hydrogen and $R^2$ and $R^3$ are methyl.

5. A polymer of claim 4 wherein Y is cyano.

6. A polymer of claim 4 wherein Y is methysulfonyl.

7. A polymer of claim 5 wherein each of A, D, and E is hydrogen.

8. A polymer of claim 6 wherein each of A, D, and E is hydrogen.

* * * * *